United States Patent
Mandalia et al.

(10) Patent No.: US 7,497,373 B2
(45) Date of Patent: Mar. 3, 2009

(54) INTELLIGENT REMINDER SERVICE TO TRACK CUSTOMER REQUESTS AND PROCESSING

(75) Inventors: Baiju D. Mandalia, Boca Raton, FL (US); Joseph G. Rusnak, Durham, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 11/198,449

(22) Filed: Aug. 5, 2005

(65) Prior Publication Data

US 2007/0033078 A1 Feb. 8, 2007

(51) Int. Cl.
*G06Q 40/00* (2006.01)
(52) U.S. Cl. .................. 235/379; 235/380; 235/382
(58) Field of Classification Search .......... 235/379, 235/380, 382; 705/7, 38
See application file for complete search history.

(56) References Cited

U.S. PATENT DOCUMENTS

| | | | |
|---|---|---|---|
| 5,920,848 A * | 7/1999 | Schutzer et al. ............ 705/42 |
| 6,222,536 B1 | 4/2001 | Kihl et al. |
| 6,385,652 B1 | 5/2002 | Brown et al. |
| 6,519,576 B1 | 2/2003 | Freeman |
| 6,721,783 B1 | 4/2004 | Blossman et al. |
| 7,006,994 B1 * | 2/2006 | Campbell et al. ............. 705/40 |
| 7,076,499 B2 * | 7/2006 | Powers ....................... 707/102 |
| 2001/0007332 A1 | 7/2001 | Kjonaas et al. |
| 2001/0007977 A1 * | 7/2001 | Geary ........................... 705/8 |
| 2001/0056401 A1 | 12/2001 | Tompkins |
| 2002/0188565 A1 | 12/2002 | Nakamura et al. |
| 2002/0188674 A1 | 12/2002 | Brown et al. |
| 2003/0097331 A1 | 5/2003 | Cohen |
| 2003/0101116 A1 | 5/2003 | Rosko et al. |
| 2007/0055561 A1 * | 3/2007 | Perrella et al. ................ 705/9 |
| 2007/0139212 A1 * | 6/2007 | Kaundinya et al. .......... 340/692 |

* cited by examiner

*Primary Examiner*—Ahshik Kim
(74) *Attorney, Agent, or Firm*—Cuenot & Forsythe, L.L.C.

(57) ABSTRACT

A method of providing reminders to facilitate a business transaction can include first identifying a personal representative of a business entity, wherein the personal representative is associated with the transaction, second determining a current availability of the personal representative according to context information for the personal representative, monitoring the transaction involving a customer and the business entity and determining whether the transaction is complete. If the transaction is not complete within a predetermined amount of time, the method can include automatically notifying the customer on behalf of the personal representative. If the transaction is not complete within an additional amount of time, the method can include automatically notifying the personal representative over a selected communication channel to contact the customer. Determining a current availability can include accessing a calendar system corresponding to the personal representative to determine whether a scheduling conflict exists.

4 Claims, 3 Drawing Sheets

INTELLIGENT REMINDER SERVICE TO TRACK CUSTOMER REQUESTS AND PROCESSING

BACKGROUND

1. Field of the Invention

The present invention relates to pervasive computing and, more particularly, to facilitating the completion of business transactions using reminders and/or notifications over any of a variety of different communication channels.

2. Description of the Related Art

Communication technology is advancing at a rapid pace. One notable advance has been the convergence of voice and data communications. To some degree, both voice and data now can be carried over a single network. Convergence has lead to the development of unified systems which are capable of sending and receiving messages over a variety of different communication channels, referring to the different types of messages that can be exchanged such as electronic mail, paging, facsimile, instant messaging, telephony, and the like. For example, when a sending user attempts to contact a target individual, a message from the sender can be transmitted over one or more of these communication channels.

Within such messaging systems, a communication channel often is selected according to a profile associated with the target user. For example, a profile can specify that messages sent through the messaging system to the target user should be forwarded as electronic mails on Mondays or as facsimiles on Tuesdays. One can see that the flexibility afforded by such messaging systems can significantly increase the effectiveness of communications within an organization.

To date, however, these capabilities have not been successfully integrated into the routine business processes performed within an organization. Conventional messaging systems have not been used within organizations in a proactive manner which complements or supports customer service functions. Accordingly, it would be beneficial to provide a system which actively supports and fosters customer service activities within a business and/or organization.

SUMMARY OF THE INVENTION

The present invention provides a solution for managing business transactions and providing notifications and/or reminders to facilitate the completion of such transactions. One embodiment of the present invention can include a method of providing reminders to facilitate a business transaction. The method can include first identifying a personal representative of a business entity, wherein the personal representative is associated with the transaction, and second determining a current availability of the personal representative according to context information for the personal representative. The method can include monitoring the transaction involving a customer and the business entity and determining whether the transaction is complete. If the transaction is not complete within a predetermined amount of time, the method can include automatically notifying the customer on behalf of the personal representative. If the transaction is not complete within an additional amount of time, the method can include automatically notifying the personal representative over a selected communication channel to contact the customer. The step of second determining a current availability can include accessing a calendar system corresponding to the personal representative to determine whether a scheduling conflict exists.

Yet another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a method, system, and apparatus for monitoring the status of business transactions and for providing reminders to facilitate the completion of such transactions. In accordance with the inventive arrangements disclosed herein, transactions can be monitored to determine when, and if, the transactions are completed. In cases where further customer action is required to complete a transaction, and the transaction remains open beyond an established period of time, one or more reminders can be provided to the customer to encourage the customer to complete the transaction or otherwise perform the needed action. Reminders also can be provided to business personnel which encourage contact with customers regarding the status of open transactions.

As used herein, a transaction can refer to any exchange of goods, services, and/or funds. With regard to the banking industry, for example, transactions can refer to various processes including, but not limited to, obtaining a mortgage, obtaining a loan, opening a bank account, establishing a credit line, or the like. In describing the different embodiments of the present invention, the banking industry is used for purposes of illustration. It should be appreciated, however, that the present invention can be used in a variety of different businesses or applications, whether banking, insurance, construction, or the like. The particular transaction type or process that can be monitored will vary according to the particular business and/or industry in which the inventive arrangements are used and/or applied.

Figure 1:
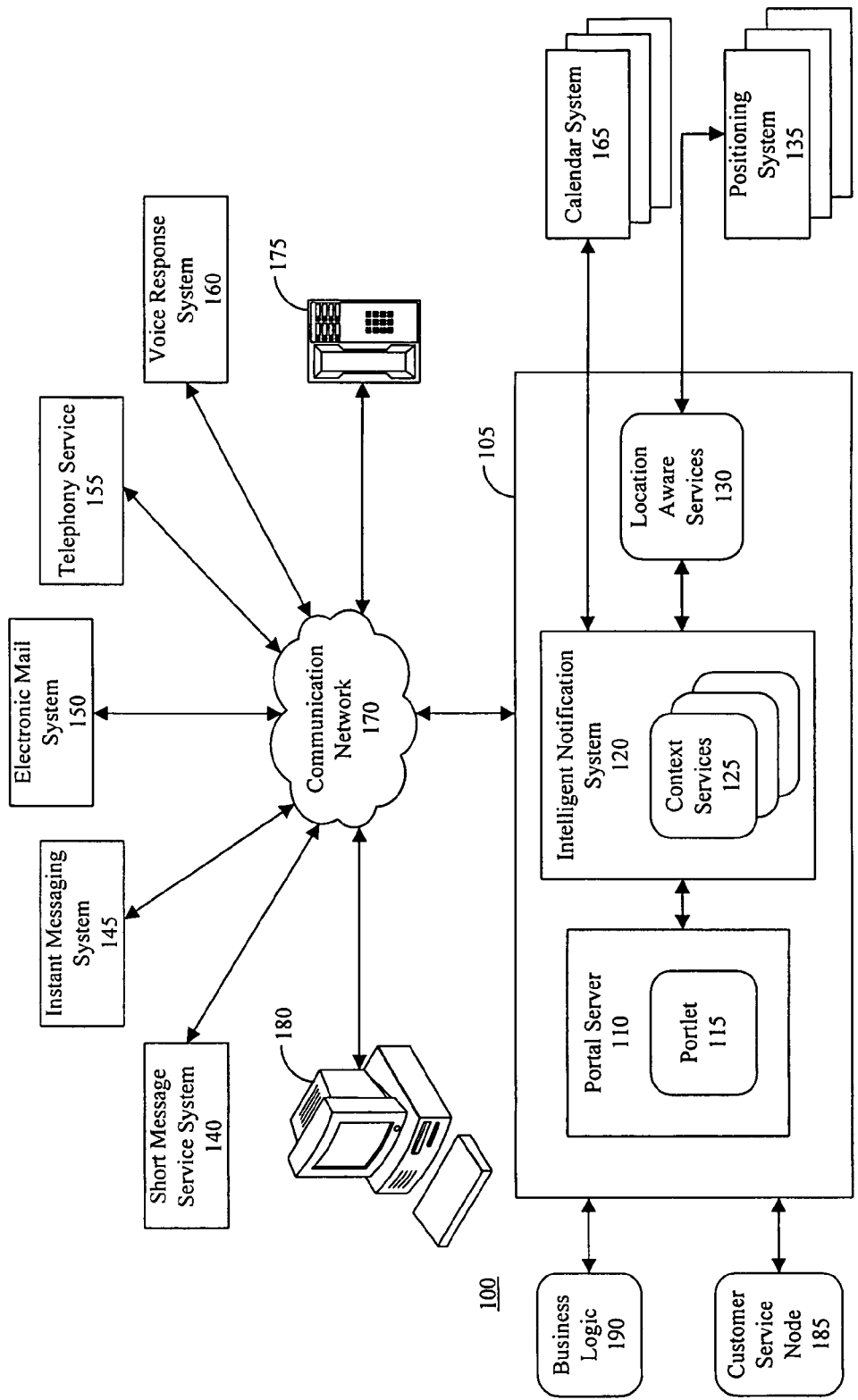
FIG. 1 is a block diagram illustrating a reminder service configured in accordance with one embodiment of the present invention.

FIG. 1 is a block diagram illustrating a reminder service 100 configured in accordance with one embodiment of the present invention. The reminder service 100 can include an on-demand computing environment (computing environment) 105 for providing applications to mobile users. Computing environment 105 can be configured as a middleware platform that provides an integrated client-server environment and application development tools to extend business applications and data to mobile devices. Computing environment 105 provides the back-end integration framework necessary for providing functions including, but not limited to, mobile personal information management, electronic mail synchronization, and access to World Wide Web (Web) based and other content.

In one embodiment, the computing environment 105 can be implemented as WebSphere® Everyplace Access, which is commercially available from International Business Machines Corporation of Armonk, N.Y. (IBM). WebSphere® Everyplace Access is described in greater detail in the following publications, which are incorporated herein by reference: IBM WebSphere Everyplace Access V5 Handbook for Developers and Administrators, Volume IV: Advanced Topics, IBM (March 2005); IBM WebSphere Everyplace Access V5 Handbook for Developers and Administrators, Volume II: Application Development, IBM (March 2005); and Adding Voice to your Portlet Applications, IBM (July 2004). In any case, the use of a particular computing environment 105 is not intended to limit the scope of the present invention.

The computing environment 105 can include a portal server 110, an intelligent notification system (INS) 120, as well as location aware services 130. The portal server 110 provides a simple, unified access point through which a variety of functions can be accessed. Although the term "portal" can be used in reference to Web-based applications, this need not be the case. The portal server 110 can be implemented as an application that provides content and/or functionality aggregation regardless of whether the Web or markup language(s) are used. For example, in one embodiment, the portal server 110 can be implemented as WebSphere® Portal, which is available from IBM.

The portal server 110 can include one or more portlets 115. In general, each portlet 115 can serve as a reusable software component which can execute within the portal server 110. In illustration, one portlet can provide a function such as document searching, another can provide for user login and/or security, and another can serve as an electronic mail client. With respect to the present invention, a portlet 115 can be provided which allows a customer and/or a customer service representative to query the system to reach other representatives of the organization. The portlet 115 can interact with the INS 120 to provide automated messaging, query, and dialog functions. Each portlet 115 can be considered a complete application which can follow a standard model-view-controller design. Each portlet 115 further can have multiple states and view modes, as well as event and messaging capabilities.

In general, the INS 120 collects context information from any of a plurality of different sources. This allows enterprises to send messages to mobile users to improve information flow and business efficiency. Context services 125 are disposed within the INS 120. The context services 125 can acquire and analyze context information relating to the availability of personal representatives (users) and make this information available to the INS 120 and other components that may have a need to use such information.

As used herein, context information can include, but is not limited to, information relating to one or more individuals as may be acquired from any combination of location aware services 130, a calendar system 165, positioning systems 135, and presence-providing systems such as instant messaging (IM) system 145 and/or a telephony service 155, which can be implemented as an Internet Protocol (IP) telephony system. With respect to the messaging systems 140-155, for example, the context services 125 can be configured to communicate with presence servers through appropriate communication protocols such as SIP for Instant Messaging and Presence Leveraging Extensions (SIMPLE) for communication with an IM system 145 presence server, Parlay for communicating with a telephony service 155 presence server, and the like.

It should be appreciated that the listing of systems from which context information can be derived is not intended to be exhaustive. As such, the list serves only as an example of some of the different types of systems that can be used in conjunction with the INS 120 and from which context information can be obtained for purposes of determining availability of an individual. For example, other means of determining context information can include, but are not limited to, providing a network-connected application that representatives can use to manually toggle availability from available to not available similar to an IM system. Workstation agents can be used which detect activity on the workstation and the type of activity that is taking place on the workstation such as the particular application being used, whether a Web conference is ongoing, and the like. Motion and/or sound detectors can provide context information. Other examples of context information can be found within J. Fogarty and S. Hudson, *Examining the Robustness of Sensor-Based Statistical Models of Human Interruptibility*, CHI 2004, Apr. 24-29, 2004, Vienna, Austria, which is incorporated herein by reference.

In any case, the INS 120 can interact with different messaging systems such as Short Message Service (SMS) system 140, which can be implemented as a Wireless Application Protocol (WAP) based system, IM system 145, electronic mail system 150, telephony service 155, and voice response system 160. The INS 120 can instruct the various messaging systems to send messages, interpret user response data received from the messaging systems, as well as implement the communications capabilities between these systems and the location aware services 130.

For example, a context service 125 can be provided which polls the IM system 145 to determine whether a particular user is logged onto the IM system 145. The context service 125 further can be tasked with communicating with the IM system 145 to command the IM system 145 to send a communication, i.e. an instant message, as well as interpret data received from the IM system 145 such as user responses. In another example, a context service 125 can be provided which can query the calendar system 165. The context service 125 can be configured to interact with the calendar system 165 to obtain scheduling information for selected user(s).

In another example, the INS 120 can interact with the voice response system 160 and instruct it to perform various functions. Voice response system 160 can perform functions such as placing telephone calls and conducting dialogs with a call recipient. Accordingly, the voice response system 160 can provide functions including, but not limited to, executing applications such as Voice Extensible Markup Language (VoiceXML) applications, playing recorded prompts, prompting users through text-to-speech technology, speech recognizing user spoken utterances, and recognizing dual tone multi-frequency (DTMF) input. These capabilities can be used to supply interactive voice response functions for telephone calls conducted over telephony service 155.

In one embodiment, the voice response system 160 can be implemented as, or include, WebSphere® Voice Response, WebSphere® Voice Application Access, and WebSphere® Voice Server, each being available from IBM. WebSphere® Voice response provides telephony connectivity to WebSphere® voice applications, which can be executed therein. WebSphere® Voice Server provides text-to-speech functionality and automatic speech recognition functions. WebSphere® Voice Application Access provides rendering of voice to WebSphere® Portal applications thereby voice-enabling portlets 115.

Users can subscribe to services set up by a system administrator, and receive timely, personalized alerts through the INS 120. The INS 120 allows users to subscribe to events and to specify an action to be taken when a match is found between a subscription and an event that is passed to the INS 120. For example, the communication capabilities of the INS 120 can be used to notify a user of the event.

Thus, the INS 120 and/or the context services 125 can be configured to perform a variety of different functions relating to context information. Other examples of functions which can be performed by the INS 120 can include collecting, maintaining, and disseminating context information as disclosed in U.S. Patent Publication No. 2003/0018692 entitled "Method and Apparatus for Providing a Flexible and Scalable Context Service"; providing context-aware unified communication for enabling communications between users over a common communications platform or heterogeneous communication platforms as disclosed in U.S. Patent Publication No. 2004/0203664 entitled "System and Method for Context-Aware Unified Communications"; as well as fuse context data for use by context aware applications as disclosed by U.S. Patent Publication No. 2004/0111397 entitled "Method and Apparatus for Fusing Context Data". Each of these patent publications is incorporated herein by reference.

Location aware services 130 provide a framework for integrating real time location information into communications and business applications. In one embodiment, the location aware services 130 provide the functionality and/or interfaces necessary for interacting with various positioning systems 135. Each location aware service 130 can be tasked with communicating with a particular positioning system 135. The positioning systems 135 can include, but are not limited to, short range wireless location tracking systems such as those based upon one of the 802.11 wireless communication protocols, Global Positioning Systems, and the like. In any case, the location aware services 130 can communicate with the various positioning systems 135 to determine whether a particular user, or more particularly mobile user device, is locatable, and if so, the location for that device and corresponding user.

Location aware services 130 also can be organized at a higher level. For example, the location aware services 130 can include services such as geocoding in reference to determining geographical coordinates for an address received as input, reverse geocoding, directory services where points of interest are located proximate to a given location, routing in reference to determining physical directions from one location to another, mapping which provides a map of a designated location, and device positioning which returns a location of a user's device.

Business logic 190 refers to one or more software applications which implement various business processes. As used herein, business logic 190 can refer to both the logic and the data embodying business functions, although it should be appreciated that data can be obtained from, or maintained by, an outside data source. In any case, the various capabilities described herein with respect to presence detection, messaging, and calendaring can be accessed by the business logic 190 via the portal server 110 and an appropriate portlet(s) 115.

In operation, a communication session can be established between a customer and a customer service representative for a business establishment. The communication session can be established via communication network 170. Communication network 170 can include the Internet, the Web, Local Area Networks, Wide Area Networks, the Public Switched Telephone Network, wireless networks whether mobile networks or shorter-range networks such as 802.11 and/or Bluetooth type wireless networks, and the like. Thus, a user can communicate via telephone 175, which can be implemented as an IP telephone, or computer 180. Accordingly, the communication session can be an IM session, a telephone call, etc.

In any case, a customer can begin a particular transaction over the communication session with a customer service representative working through customer service node 185. The customer service node 185 can be any of a variety of communication systems, whether a computer, an IP telephone, or the like, so long as the customer service node 185 can serve as an interface for one or more of the communication channels and corresponding messaging systems 140-160 described herein. A softswitch (not shown) can be incorporated to allow voice and video to be exchanged between different communication channels and/or types of endpoints, for example between an IP telephone and a computer terminal.

It should be appreciated that while the customer service representative is described as a human being, in other embodiments the customer service representative can be implemented as an application program, a virtual representative, etc. Thus, the customer can interact with an automated customer service representative, for example that executes and/or is displayed within the customer service node 185, which can access and/or interact with a portlet 115 of the portal server 110, or another component of the system 100.

During the communication session, the customer service representative can collect information from the customer. The customer service representative can access a portlet 115 via the customer service node 185. The portlet 115 can interact with the business logic 190 to determine whether a customer profile exists for the customer based upon the collected information. If a customer profile does exist, the customer profile can be identified using the customer supplied information. If a customer profile does not exist, the customer service representative can select an option through portlet 115 which causes the business logic 190 to create a customer profile to support the transaction being initiated.

Based upon the identity of the customer and/or the type of transaction being conducted or initiated, a personal representative of the business organization can be selected or identified. The personal representative can be charged with overseeing the relationship between the customer and the business organization and/or the transaction that is being initiated.

In one embodiment, if the customer has a profile maintained within the business logic, the profile can specify a particular personal representative that is associated with the customer. Customer identifying information can be provided to the portal server 110, and a selected portlet 115, from the customer service node 185. The portlet 115 can interface with the business logic 190 to determine the profile for the user as well as the personal representative.

In another embodiment, the personal representative can be selected based upon the type of transaction that is being initiated. In that case, the customer service representative can inquire as to the transaction that the customer wishes to initiate. This information can be provided to a selected portlet 115, which can interact with the business logic 190 to select the appropriate personal representative based, at least in part, upon the transaction type. It should be appreciated, however, that other attributes, for example those relating to the customer as may be specified in the customer profile, the accounts held by the customer, or the size of the accounts, can be used to select an appropriate personal representative. Representatives can be associated with profiles maintained within the business logic 190. Accordingly, customers can be matched with representatives based upon a correspondence between attributes of the customer and/or the transaction and attributes of the personal representative.

The portlet 115 further can interact with the INS 120 to determine availability of the personal representative. Availability can be determined from context information obtained from the various systems described herein, for example using location and presence information for the personal representative which can be obtained by the INS 120 via the positioning systems 135 and messaging systems 140-160. Further, the INS 120 can determine availability of the personal representative via the calendar system 165. This information can be provided back to the portlet 115.

If the personal representative is available, the portlet 115 can instruct the INS 120 to notify the personal representative using one or more messaging systems 140-155 and associated communication channels about the need or possibility of meeting with the customer. The customer and the personal representative can meet in person, via teleconference, video conference, IM session, or the like. If the personal representative is not available, a meeting can be scheduled between the customer and the personal representative at some future time.

The business logic 190 can continue to monitor the status of any transaction(s) that were initiated by the customer. At some time subsequent to any meeting between the customer and the personal representative, if the transaction is not complete, the business logic 190 can send a message to a portlet 115. Upon receiving the message, portlet 115 can instruct the INS 120 to cause a message to be sent from one or more of the messaging systems 140-160 to the customer on behalf of the personal representative. The communication can prompt the user to perform some action that may be needed to further or finish the transaction.

If the transaction remains unfinished for a further time period, the business logic 190 can send a message to the portlet 115, which causes the INS 120 to send a message to the personal representative over one or more selected communication channels. The message can prompt the personal representative to contact the customer to further the transaction.

Figure 2:
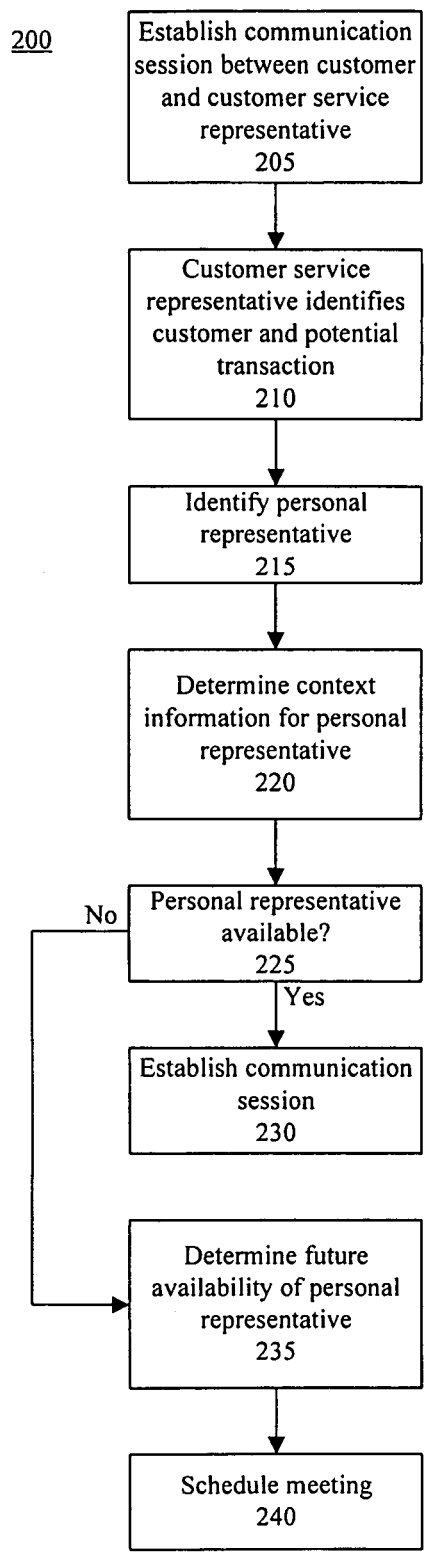
FIG. 2 is a flow chart illustrating a method of initiating a transaction in accordance with another embodiment of the present invention.

FIG. 2 is a flow chart illustrating a method 200 of initiating a transaction in accordance with another embodiment of the present invention. Method 200 can be performed using the system described with reference to FIG. 1. While method 200 will be described with reference to a banking establishment, as noted, the present invention is not limited to use in such an industry. The present invention can be used in any of a variety of different business applications to provide notifications and reminders pertaining to various business transactions.

Method 200 can begin in step 205 where a customer establishes a communication session with a customer service representative of a banking establishment. As noted, the communication session can be any of a variety of interactive communication sessions, whether IM, telephony, videoconference, or the like. In step 210, the customer service representative can collect information from the customer such as identification information and the type of transaction the customer is interested in initiating.

For example, a customer can call a bank in an effort to establish a line of credit. During the telephone call, the customer service representative can obtain identifying information from the customer such as a name, account number if an existing client, and contact information, whether a physical address, telephone number, electronic mail address, IM address, etc. The customer service representative further can ask the customer about the particular service about which the customer is inquiring.

In any case, in step 215, a personal representative can be selected and/or identified. The customer service representative can initiate a search for a representative that will be associated with the customer and/or the transaction to be initiated. Working through the customer service node, the customer service representative can access a portlet in the portal server. The portlet can serve as an intermediary to the business logic.

In one embodiment, for example where the customer is an existing customer of the bank, the customer service representative can provide customer identifying information to the portal, such as a name, account number, or the like. A portlet can query the business logic to determine the personal representative associated with the customer. In another embodiment, a personal representative can be selected based upon the particular transaction to be initiated. If, for example, the transaction is a home mortgage, a home mortgage specialist can be selected and associated with the customer, the transaction, or both the customer and the transaction.

In step 220, context information for the personal representative can be determined. As noted, context information can include, but is not limited to, presence of the personal representative on one of the messaging systems, the location of the personal representative, and/or calendar information for the personal representative. The portlet, having identified a personal representative, can query the INS for this information. Within the INS one or more context services can be called to ascertain the context information. For example, a context service can query one or more of the messaging systems to determine whether the personal representative is logged onto the system(s) and, therefore, has a presence on the messaging system(s). A context service can query the location services to determine location information for the personal representative. A context service further can query the calendar system to determine whether the personal representative has a conflicting appointment or has been scheduled for another activity at the present time or in the very near future, i.e. within the next 10 minutes or so which would preclude a meeting with the customer.

This information can be passed from the INS back to the portlet, which, in step 225, can determine whether the personal representative is available. The determination as to whether the personal representative is available can be performed using any of a variety of different techniques. For example, in one embodiment, the determination can be based upon whether the calendar information indicates that the personal representative is available. In another embodiment, availability can be based upon whether the personal representative has a presence upon one of the messaging systems. In another embodiment, availability can be determined according to the location information, i.e. whether the representative is on-site or within a particular geographic area. In still another embodiment, availability can be determined based upon any combination of the presence, location, and/or calendar information as may be established by an availability policy within the system.

In any case, if the personal representative is available, the method can proceed to step 230, where a communication session can be established. In one embodiment, the customer can be transferred to the personal representative. The communication channel used can be the same communication channel used between the customer and the customer service representative. That is, if the customer called the bank, the call can be transferred to a telephone number for the personal representative. If the original communication session was an IM session, the customer can be joined into an IM session with the personal representative.

If the personal representative is not available, the method can proceed to step 235, where future availability of the personal representative can be determined. In that case, the portlet, after determining that the personal representative is not available, can access the calendar data for the personal representative via the INS. One or more future appointment times during which no other appointments are scheduled for the personal representative can be identified and relayed to the customer service representative via the customer service node. The customer service representative can, in turn, present the available times to the customer. Alternatively, the customer can indicate preferred times to the customer service agent. The customer service agent, acting through the customer service node, the portlet, the INS, and the calendar system, can determine the availability of the personal representative for the requested times.

Regardless, once a time is agreed upon by the customer, the customer service representative can cause a calendar entry to be made in the calendar of the personal representative in step 240. The calendar entry can reserve the corresponding time and/or date for meeting with the customer via an appropriate communication channel. It should be appreciated that the scheduled meeting also can be an in-person, or on-site, meeting.

In another embodiment of the present invention, alternate representatives can be selected if the originally selected personal representative is not available. In that case, an alternate representative having the same or similar qualifications as the personal representative can be selected. The qualifications can be maintained within an employee profile. If an alternate representative is available, a communication session can be established between the customer and the personal representative in the same manner as discussed with reference to step 230.

Figure 3:
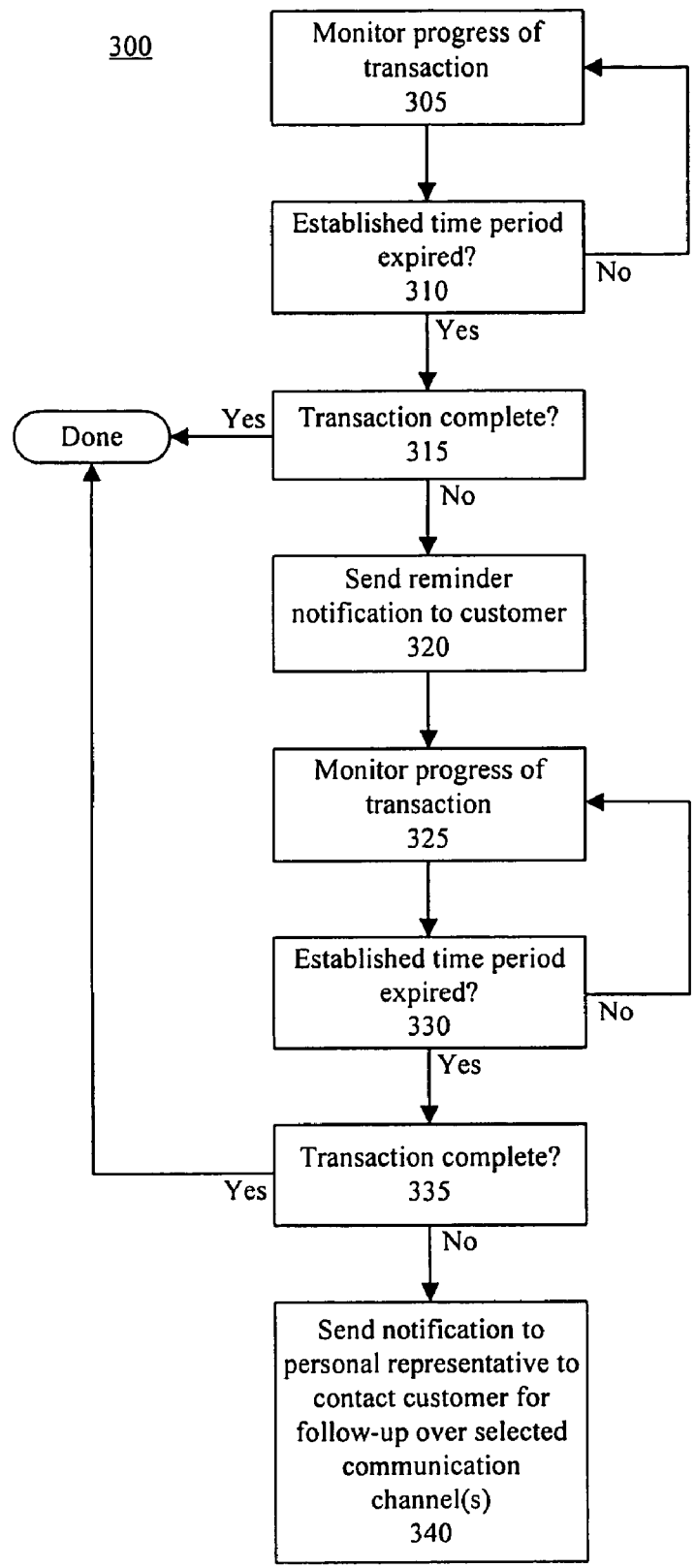
FIG. 3 is a flow chart illustrating a method of providing reminders relating to a transaction in accordance with yet another embodiment of the present invention.

FIG. 3 is a flow chart illustrating a method 300 of providing reminders relating to a transaction in accordance with yet another embodiment of the present invention. In one embodiment, method 300 can be performed after the occurrence of the meeting that was scheduled with reference to FIG. 2. Method 300, however, can be performed for any of a variety of transactions that are started regardless of how the transaction was initiated.

Method 300 can begin in a state where a transaction has been initiated, but not completed. Examples of transactions can include, but are not limited to, opening an account, opening a credit line, acquiring a home mortgage, etc. In step 305, the business logic can monitor the status of the transaction. In step 310, a determination can be made as to whether an established period of time has expired. While shorter time periods such as several minutes and/or seconds can be monitored, it should be appreciated that the business logic can monitor a given transaction over a longer period of time whether hours, days, or weeks. If the time period has not expired, the method can loop back to step 305 to continue monitoring the status of the transaction. If the time period has expired, the method can proceed to step 315.

In step 315, the business logic can determine whether the transaction has been completed. If so, the method can end, as no reminders are necessary for prompting either the customer or the personal representative to move forward with transaction. If the transaction is not finished, however, the method can proceed to step 320, where a reminder notification can be sent to the customer.

The business logic can communicate with the INS to request that a notification be sent to the customer. The context service can instruct one or more messaging systems to send the reminder via a corresponding communication channel, whether as an IM, an automated telephone call, or an electronic mail. The particular communication channel used can be determined using a customer profile and/or through one or more enterprise policies which can be maintained within the business logic. The enterprise policies can vary with the transaction type, urgency of the transaction, and so forth.

The reminder notification can be sent on behalf of the personal representative. Thus, if the communication is an IM or an electronic mail, the communication can be formatted as if sent by the personal representative or indicate that the message was sent on behalf of the personal representative. In the case of a telephone call, the voice response system can indicate that the call was originated on behalf of the personal representative. The communication can indicate to the customer that further action is required to continue with the transaction.

In one embodiment, the business logic can be configured to trigger such reminders only in cases where further action is required on the part of the customer. Thus, in situations where all actions to be performed by the customer in relation to the transaction have been performed, and the transaction cannot proceed due to inaction on the part of the personal representative or business organization, a notification need not be sent to the customer.

In step 325, the business logic can continue monitoring whether the transaction has been completed. In step 330, a determination can be made as to whether an additional time period has expired. If not, the method can loop back to step 325 to continue monitoring the status of the transaction. Again, as noted, monitoring of the transaction can take place over seconds, minutes, hours, days, and/or weeks. If the additional time period has expired, the method can proceed to step 335, where a determination can be made as to whether the transaction has been completed.

If the transaction has been completed, the method can end. If not, the method can continue to step 340, where a notification can be sent to the personal representative. The business logic can instruct the INS to send a message to the personal representative via a selected messaging system and corresponding communication channel. In one embodiment, the particular communication channel over which the communication is sent can be selected according to the availability of the personal representative. As noted, availability can be determined using context information for the personal representative. Policies can be established which determine the particular communication channel to be used to send the notification based upon the available or known context information.

For example, if the calendar of the personal representative indicates that the representative is out of the office, the notification can be sent to a mobile device, whether to a mobile phone as a voice message from the voice response system as a telephone call, as an IM, as an SMS, or the like. If presence information indicates that the personal representative is available via a particular communication channel, i.e. IM, then the notification can be sent via that communication channel. It should be appreciated that notifications can be sent via multiple communication channels if so desired. In any case, the notification can prompt and/or remind the personal representative to contact the client for follow-up. In the event that the transaction is stalled awaiting further action on the part of the personal representative, the notification can prompt and/or remind the personal representative to perform the needed action.

The methods described herein have been provided for purposes of illustration only, and as such, are not intended as limitations of the present invention. In illustration, it should be appreciated that any automated querying conducted by a messaging system can be more complex in nature, i.e. as a dialog between the personal representative and the messaging system. For example, a messaging system can query the personal representative as to which communication channel is suitable for the meeting, an alternative meeting time, etc. In further illustration, availability can be determined by using a messaging system to contact the personal representative. The messaging system can query the representative as to availability. A portlet or the INS can make a determination regarding availability based upon the answer received from the personal representative in response to the query, whether verbal or text-based.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing reminders to facilitate a business transaction comprising:
   first identifying a personal representative of a business entity, wherein the personal representative is associated with the transaction;
   second determining a current availability of the personal representative according to context information for the personal representative;
   monitoring the transaction involving a customer and the business entity;
   determining whether the transaction is complete;
   if the transaction is not complete within a predetermined amount of time, automatically notifying the customer on behalf of the personal representative; and
   if the transaction is not complete within an additional amount of time, automatically notifying the personal representative over a selected communication channel to contact the customer;
   wherein said step of second determining a current availability further comprising accessing a calendar system corresponding to the personal representative to determine whether a scheduling conflict exists.

2. The method of claim 1, wherein the personal representative is not currently available, said method further comprising:
   determining a future availability for the personal representative using the calendar system; and
   automatically placing an entry, corresponding to a meeting between the personal representative and the customer, in the calendar system of the personal representative based, at least in part, upon the future availability of the personal representative.

3. A machine readable storage, having stored thereon a computer program having a plurality of code sections executable by a machine for causing the machine to perform the steps of:
   monitoring a transaction involving a customer and a business entity, wherein a personal representative of the business entity is associated with a transaction;
   determining whether the transaction is complete;
   if the transaction is not complete within a predetermined amount of time, automatically notifying the customer on behalf of the personal representative; and
   if the transaction is not complete within an additional amount of time, automatically notifying the personal representative over a selected communication channel to contact the customer, said step of automatically notifying the personal representative further comprising selecting at least one communication channel from a plurality of communication channels, wherein the at least one communication channel is selected based upon an availability of the personal representative as determined from context information; and
   determining an availability of the personal representative based upon at least one of presence information for the personal representative with respect to a plurality of messaging systems or calendar information for the personal representative obtained from a calendar system.

4. A machine readable storage, having stored thereon a computer program having a plurality of code sections executable by a machine for causing the machine to perform the steps of:
   first identifying a personal representative of a business entity, wherein the personal representative is associated with a transaction;
   second determining a current availability of the personal representative based upon context information for the personal representative;
   monitoring the transaction involving a customer and the business entity;
   determining whether the transaction is complete;
   if the transaction is not complete within a predetermined amount of time, automatically notifying the customer on behalf of the personal representative; and
   if the transaction is not complete within an additional amount of time, automatically notifying the personal representative over a selected communication channel to contact the customer;
   wherein the personal representative is not currently available, said method farther comprising determining a future availability for the personal representative using the calendar system and automatically placing an entry, corresponding to a meeting between the personal representative and the customer, in the calendar system of the personal representative based, at least in part, upon the future availability of the personal representative.

* * * * *